United States Patent
Behnken et al.

(10) Patent No.: US 10,762,125 B2
(45) Date of Patent: Sep. 1, 2020

(54) SORTING IMAGES BASED ON LEARNED ACTIONS

(71) Applicant: International Business Machines Corporation, Armonk, NY (US)

(72) Inventors: John Behnken, Hurley, NY (US); James R. Kozloski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 15/812,394

(22) Filed: Nov. 14, 2017

(65) Prior Publication Data

US 2019/0147054 A1    May 16, 2019

(51) Int. Cl.
| | |
|---|---|
| *G06F 7/08* | (2006.01) |
| *G06F 16/51* | (2019.01) |
| *G06F 16/54* | (2019.01) |
| *G06T 7/00* | (2017.01) |
| *G06T 1/00* | (2006.01) |

(52) U.S. Cl.
CPC .............. *G06F 16/51* (2019.01); *G06F 7/08* (2013.01); *G06F 16/54* (2019.01); *G06T 1/0007* (2013.01); *G06T 7/97* (2017.01)

(58) Field of Classification Search
None
See application file for complete search history.

(56) References Cited

U.S. PATENT DOCUMENTS

| | | | | |
|---|---|---|---|---|
| 6,055,569 A | * | 4/2000 | O'Brien | G06F 16/9574 709/223 |
| 7,437,005 B2 | * | 10/2008 | Drucker | G06F 3/0483 382/224 |
| 7,558,822 B2 | * | 7/2009 | Fredricksen | G06F 16/954 709/203 |
| 7,724,978 B2 | * | 5/2010 | Nonaka | G06F 16/58 382/254 |
| 7,747,627 B1 | * | 6/2010 | Shetty | G06F 16/122 707/741 |
| 8,468,110 B1 | * | 6/2013 | Podgorny | G06F 11/3438 706/45 |
| 8,849,730 B2 | * | 9/2014 | Winn | G06Q 10/10 706/12 |
| 9,536,293 B2 | | 1/2017 | Lin et al. | |
| 9,542,626 B2 | | 1/2017 | Martinson et al. | |
| 9,613,058 B2 | | 4/2017 | Shen et al. | |

(Continued)

OTHER PUBLICATIONS

Aryafar et al., Exploring User Behaviour on Etsy through Dominant Colors, 2014 22nd International Conference on Pattern Recognition, pp. 1437-1442 (Year: 2014).*

(Continued)

*Primary Examiner* — Cheyne D Ly
(74) *Attorney, Agent, or Firm* — Jared L. Montanaro (57) ABSTRACT

A device may capture one or more images. The device may automatically sort the one or more images into a save category and a delete category. The device may predict an action of a user towards the one or more images in the save category. The device may rank the one or more images in the save category based on the predicted action of the user. The device may display a first image to the user. The first image may have a highest rank among the one or more images in the save category.

15 Claims, 6 Drawing Sheets

(56) References Cited

U.S. PATENT DOCUMENTS

| | | | | |
|---|---|---|---|---|
| 9,817,846 B1* | 11/2017 | Srinivasan | ......... | G06F 16/9535 |
| 2010/0169822 A1* | 7/2010 | Hollemans | ............ | G06F 3/0485 |
| | | | | 715/784 |
| 2013/0159408 A1* | 6/2013 | Winn | ..................... | G06N 20/00 |
| | | | | 709/204 |
| 2015/0077376 A1* | 3/2015 | Masuda | ................ | G06F 3/0488 |
| | | | | 345/173 |
| 2016/0117587 A1 | 4/2016 | Yan et al. | | |
| 2017/0068899 A1* | 3/2017 | Laptev | .................. | G06N 7/005 |

OTHER PUBLICATIONS

Anonymous, "Deep Learning Based Optical Character Recognition System," An IP.com Prior Art Database Technical Disclosure, IP.com No. IPCOM000249656D, IP.com Electronic Publication Date: Mar. 15, 2017, pp. 1-6.

Anonymous, "Cascade deep learning model training for visual analytics," An IP.com Prior Art Database Technical Disclosure, IP.com No. IPCOM000245969D, IP.com Electronic Publication Date: Apr. 21, 2016, pp. 1-4.

Anonymous, "Retinal Image Quality Classification Using Convolutional Neural Networks," An IP.com Prior Art Database Technical Disclosure, IP.com No. IPCOM000245601D, IP.com Electronic Publication Date: Mar. 21, 2016, pp. 1-5.

Krizhevsky et al., "ImageNet Classification with Deep Convolutional Neural Networks," https://www.nividia.cn/-/imagenet-classification-with-deep-convolutional-neural-networks.pdf, pp. 1-9., 2012.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

SORTING IMAGES BASED ON LEARNED ACTIONS

BACKGROUND

The present disclosure relates generally to the field of image selectivity, and more specifically to automatically and cognitively selecting images for a specific user.

Many devices now incorporate a rapid image capture feature that take tens of pictures a second. A user exercising the rapid image capture feature typically has to manually sort and delete through the multiple pictures.

SUMMARY

Embodiments of the present disclosure include a method, computer program product, and system for automatically sorting multiple images based on a user's preference(s). A device may capture one or more images. The device may automatically sort the one or more images into a save category and a delete category. The device may predict an action of a user towards the one or more images in the save category. The device may rank the one or more images in the save category based on the predicted action of the user. The device may display a first image to the user. The first image may have a highest rank among the one or more images in the save category.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of image selectivity, and more specifically to automatically and cognitively selecting images for a specific user. While the present disclosure is not necessarily limited to such applications, various aspects of the disclosure may be appreciated through a discussion of various examples using this context.

A user owning a device (e.g., a smartphone, a laptop, a tablet, etc.) may desire to take multiple pictures at a time in order to have multiple options when choosing the best picture. However, the user is typically forced to manually sort through the multiple pictures to determine the best picture of the multiple pictures. Additionally, while capturing the pictures the device does not typically take into account the user's personal preferences (e.g., Sephora filtering, antique filtering, low-lighting, etc.), which can be applied during capturing. As such, the user may turn to a program that automatically and cognitively selects the best picture(s), as based on the user's preferences, from the multiple pictures.

In some embodiments, a device may capture one or more images. The device may automatically sort the one or more images into a save category and a delete category. In some embodiments, the device may sort the one or more images based, at least in part, on a quality of the image (e.g., the clarity/blur of the image, etc.) The device may delete the pictures in the delete category. The device may predict an action of a user towards the one or more images in the save category. The device may rank the one or more images in the save category based on the predicted action of the user. In some embodiments, the device may additionally rank the one or more images in the save category based on historical user data/actions. The device may display a first image to the user. The first image may have a highest rank among the one or more images in the save category.

For example, a user may use a camera on their smartphone to take 30 pictures of sea otters at a zoo. The smartphone may access a repository that stores the pictures (e.g., a memory in the smartphone, the Cloud, etc.) and using image verification techniques, such as, using a deep convolutional neural network (DCNN), sort the images. The criteria for sorting may be that any pictures without red-eye and that are not 25% blurred (e.g., a quarter portion of the picture is blurred from the camera moving during the picture taking) are moved to a save category and the rest of the pictures failing to meet the criteria are moved to a delete category.

The smartphone may determine that 3 pictures meet the criteria and place the 3 pictures in the save category. The smartphone may additionally determine that 27 pictures fail to meet the criteria and place the 27 pictures in the delete category. The device, detecting that the 27 pictures in the delete category did not meet the criteria, may then automatically delete the delete category (e.g., the 27 pictures). The device may simultaneously (or sequentially) look at the images in the save category and rank each of the 3 pictures based on what the user is most likely to do with the pictures (e.g., post the picture to a social media site, laugh, cry, etc.).

The device may have identified from previous pictures that the user likes to upload pictures to social media sites (e.g., the predicted action), and the smartphone may access popular sea otter videos and pictures to identify what most individuals like to view on social media. Thus, the smartphone may identify a first picture that has a sea otter smiling and determine to rank the first picture as "1" (e.g., the likely best picture to post to social media). The smartphone may additionally rank a second picture of the sea otter grooming as "2" and a third picture of the sea otter swimming as "3." In some embodiments, the smartphone may consider previous user selections when determining which picture to upload to the social media site (e.g., the user prefers pictures of the sea otter swimming).

The smartphone may display the picture of the otter smiling to the user as a suggestion of the best (e.g., highest ranked) picture to upload to a social media site. In some embodiments, the smartphone may prompt the user with the predicted action (e.g., prompt the user to upload the picture to the social media site). In some embodiments, the smartphone may alert the user before deleting the delete category and wait for the user to accept or deny the deleting of the delete category (e.g., the user may choose to save the pictures in the delete category). In some embodiments, the smartphone may automatically upload the best picture to a social media site and/or a cloud based storage system.

In some embodiments, multiple devices commonly owned by a user may capture the one or more images. The one or more images from the multiple devices may be stored in a cloud based storage system, and the storage system performs the functions described above being performed by the device.

In some embodiments, capturing the one or more images may comprise automatically modifying a filter of the device (e.g., black/white filter, antique, etc.) during the capturing of the one or more images. The filter may be determined by the predicted action of the user. For example, a device that includes a camera may determine from previous picture taking events that the owner of the device likes the subject of the picture to be more prominent than the background. This may be an unconscious preference that even the owner is unaware of. The owner of the device may open a camera application and access a rapid picture taking mode that takes 20 pictures in one second.

The device may identify in the first two pictures that the subject of the pictures is a butterfly and that the aperture of the camera is too small (e.g., producing a sharp, clear background of grass) for the owner's liking. The device may then gradually increase the aperture of the camera every two pictures up to the full 20 pictures (e.g., with the last two pictures taken with the largest aperture and producing a blurred background of grass) in order to achieve a gradient of different backgrounds for the pictures. The gradient of different backgrounds allowing the device more options when determining the best picture from the 20 pictures.

In some embodiments, sorting the one or more images into the save category and the delete category may include the device analyzing each of the one or more images. The device may then determine a respective key feature in each of the one or more images.

For example, a user using a device may take 50 pictures during a concert. The pictures may include an opening act performer and a main event performer. The device may analyze each picture and determine that 10 pictures include the opening act performer (e.g., a key feature) and that 40 pictures include the main event performer (e.g., another key performer). The device may determine the number of pictures related to each performer by comparing each of the pictures against one another (e.g., comparing a main event performer picture against an opening act performer picture to determine they do not share the same key feature, or the device may tag each picture with metadata indicating the different performers). The sorting of the pictures based on key features may allow the device to sort the group of pictures with the same key feature using different criteria (e.g., threshold quality, etc.) than for a group of pictures with a different key feature.

In some embodiments, when sorting the one or more images, the device may further identify, from the respective key feature in each of the one or more images, a threshold quality of the respective key feature. The device may separate each image with the respective key feature below the threshold quality into the delete category and each image with the respective key feature above the threshold quality into the save category.

Following the example above, the device may determine from the number of pictures dedicated to each performer, that the device should give more leeway to the quality of the opening act performer's pictures as compared to the quality of main event performer's pictures. That is, the device may determine that only pictures of the main event performer standing still (e.g., providing the clearest image of the main event performer) will be placed in the save category. Whereas, any pictures of the opening act performer not 50% blurred, with the opening act performer standing still or moving, will be placed in the save category.

In some embodiments, deleting the delete category may include the device displaying an alert to the user. The alert may provide a response option for the user to delete the delete category. The device may then identify the response. In some embodiments, upon identifying the response, the device may delete the delete category if the response was to delete the delete category. Or, the device may move each image in the delete category to the save category if the response was not to delete the delete category.

In some embodiments, if the response is not to delete the delete category, the device may leave the images in delete category and transform the delete category into a repository of images that is saved until further interaction from the user. The user making a decision to continue saving or deleting the multiple images in at a future time. In some embodiments, the device may rank each image in the delete category and provide the user an option to manually delete which pictures the user desires.

In some embodiments, ranking the one or more images in the save category based on the predicted action of the user may comprise the device monitoring one or more actions of the user associated with one or more previous images. The device may associate the one or more actions to a respective key feature of each of the one or more previous images. The device may identify images of the one or more images in the save category that correspond to at least one of the respective key features of the one or more previous images.

For example, a user's tablet may identify that the user spends an average of 10 seconds staring (e.g., an action) at pictures of his dog (e.g., a respective key feature), whereas he only spends 5 seconds staring (e.g., a second action) at pictures of his cat (e.g., a second respective key feature). The tablet may determine from the times spent at looking at the pictures that the dog is associated with a longer viewing period and thus more likely to want to be viewed by the user than the cat.

The user may then take new pictures of each animal and the tablet may sort the pictures into a save category and a delete category. The tablet may then identify which pictures in the save category have the dog and which have the cat. The tablet may rank all pictures of the dog higher that all pictures of the cat based on the user's staring at the dog pictures longer than the user stares at the cat pictures.

In some embodiments, the predicted action of the user may be application specific. For example, the device may identify that when the user directly accesses a camera, the user is likely to store the pictures taken with the camera in a personal storage space. Whereas, when the camera is indirectly accessed by the user initiating an application, the device may identify that the user is likely to upload the images to a social media site.

In some embodiments, the device may identify that a user did not act as predicted to the display of the first image. The device, based on the user's predicted action and actual action to the display of the first image, may re-rank the one or more images in the save category. The device may then display a second picture to the user.

For example, a user's laptop may identify that a user every 8 out of 10 times laughs at pictures of baby elephants, and after a day at the zoo, the user may upload 100 pictures to the laptop. The laptop may sort the pictures and identify that 10 of the pictures include adult and adolescent elephants. The laptop with a high degree of certainty that the user will laugh at a high-quality (e.g., clear picture), adult elephant picture may rank the picture as the best picture to initially display to the user.

The laptop may display the adult elephant picture to the user, however the user may only look at the photo for one second and not laugh (e.g., because the picture is of an adult elephant and not a baby elephant). The laptop may then remove the adult elephant picture from the first ranked position and re-rank the elephant pictures. The laptop may display a second picture of an adolescent elephant picture that is lower quality (e.g., not as clear as) than the adult elephant picture. The laptop displaying the second picture in order to try to achieve the predicted action of the user laughing. In some embodiments, the laptop may not re-rank the pictures and may sequentially display the ranked pictures to the user (e.g., show the second highest ranked picture after the first, then the third highest ranked picture after the second, etc.).

Figure 1:
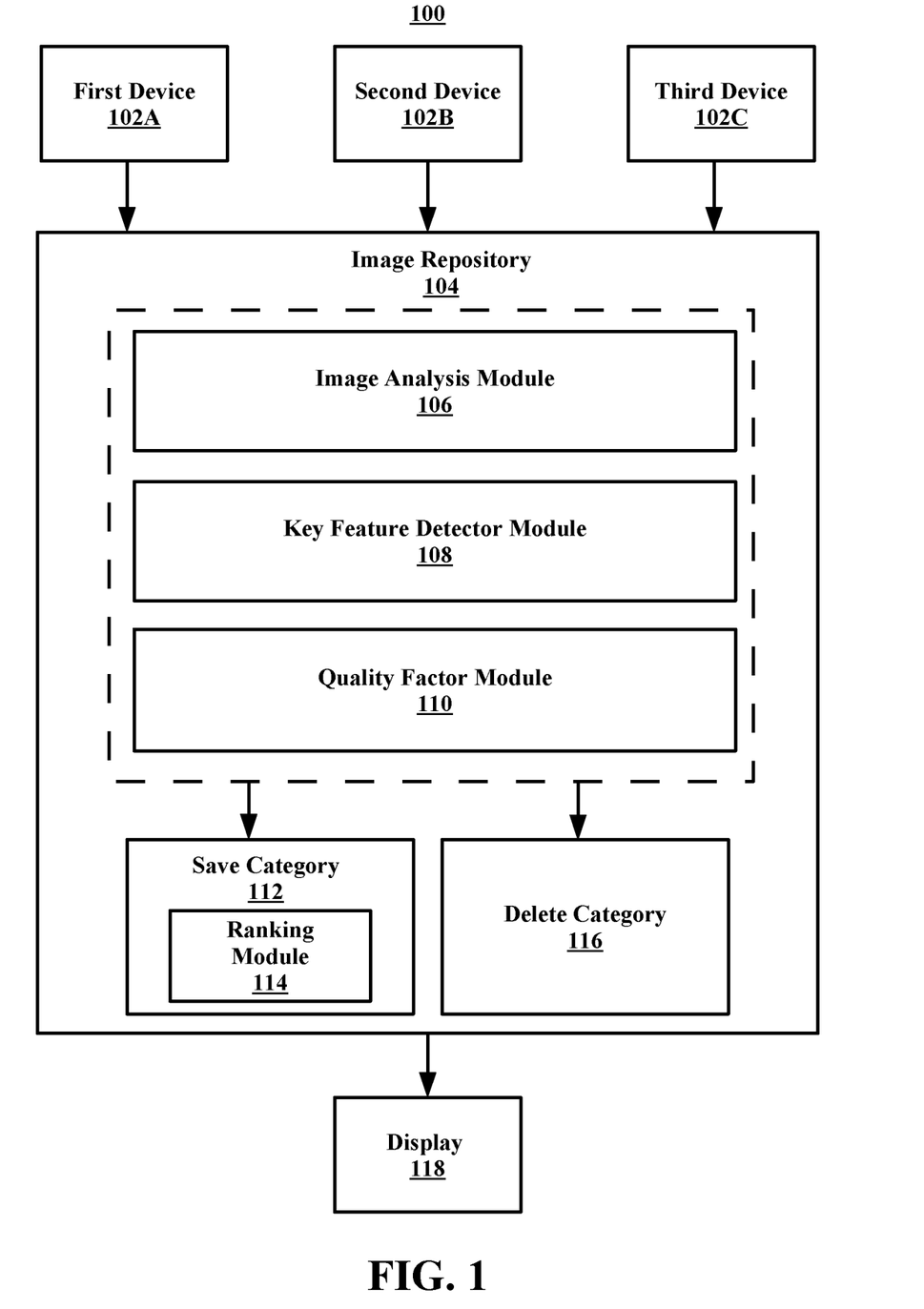
FIG. 1 depicts a block diagram of an example system for automatically sorting images based on predicted user actions, in accordance with embodiments of the present disclosure.

Referring now to FIG. 1, illustrated is a block diagram of an example system 100 for automatically sorting images based on predicted user actions, in accordance with embodiments of the present disclosure. In some embodiments, the system 100 may include a first device 102A, a second device 102B, a third device 102C (sometimes collectively referred to as the devices 102A-C), an image repository 104 (e.g., a cloud storage unit, an internal memory component of one of the devices 102A-C, etc.), and a display 118. In some embodiments, the display 118 may be on one of the devices 102A-C).

In some embodiments, the image repository 104 may include an image analysis module 106, a key feature detector module 108, a quality factor module 110, a save category 112 (e.g., an image gallery/album to be saved), and a delete category 116 (e.g., an image gallery/album to be deleted). In some embodiments, the save category 112 may include a ranking module 114.

A user owning the devices 102A-C may register the devices 102A-C to upload images captured on each of the devices to the image repository 104. Upon the receiving any images from one, or any combination, of the devices 102A-C, the image repository 104 may use the image analysis module 106 to identify the images represented in the pictures. For example, the image repository may receive a set of images that include a horse running, a jockey dismounting the horse, and the jockey on a trophy podium. The image analysis module 106 may be a deep convolutional neural network that cognitively identifies what the images are. That is, the analysis module 106 will correctly identify the images sent to the image repository 104 as the horse running, the jockey dismounting, and the jockey on the podium.

After analyzing the images with the image analysis module 106 to identify the images, the key feature detector module 108 may determine the main subject of each image. Following the example above, the key feature detector module 108, after the image analysis module 106 has identified and clarified the images, may identify that the horse is the key feature of the first image, that the jockey is the key feature of the second image (the determination of the jockey being the key feature of this image discussed below in regard to the quality factor module 110), and that the jockey is the key feature of the third image.

In some embodiments, the key feature detector module 108 may work in tandem (e.g., simultaneously) with the image analysis module 106 and determine key features of images at the same time that the image analysis module 106 is determining what the image actually is. In some embodiments, the key feature detector module 108 may tag each image with an indicator that is associated with the key feature of the image.

In addition to identifying the key feature of the images with the key feature detector module 108, the image repository 104 may utilize the quality factor module 110 to sort images into the save category 112 or the delete category 116. The quality factor module 110 may additionally influence the key feature detector module 108. Following the example above, the key feature detector module 108 may determine that the jockey is the key feature of the second image because the quality factor module 110 identified that the jockey in the image was in full focus and the horse was blurred in the background. The key feature detector module 108 using the information from the quality factor module 110 may cognitively determine that the user was likely taking a picture of the jockey and not the horse in the second image.

The quality factor module 110 may utilize image metrics, such as, composition, spatial frequency, eye analysis, facial expression analysis, posture analysis, focus, and lighting to make a cognitive assessment of where to sort the images received by the image repository 104. For example, the image repository may receive 100 pictures from the device 102A-C. The image analysis module 106 may identify that the 100 pictures are of a wedding and the key feature detector 108 may tag 30 pictures having a key feature being a bride (e.g., by identifying a long, white dress), 30 pictures having a key feature being a groom (e.g., by the groom having the objectively most "put-together" tuxedo with pocket squares and cummerbund), and 40 pictures having a key feature of the wedding party (e.g., the bride and groom, plus multiple people in the same dress and other tuxedos).

The quality factor module 110 using facial expression analysis may then begin sorting the 30 pictures of the bride and place 25 pictures having the bride smiling in the save category 112 and 5 pictures of the bride scowling in the delete category 116. The quality factor module 110 may sort the 30 pictures of the groom and place 15 pictures of the groom smiling in the save category 112 and place 15 pictures of the groom scowling in the delete category 116. The quality factor module 110 may additionally sort the 40 pictures of the wedding party, placing 30 pictures of the group where each member of the group is looking directly at a camera in the save category 112 and 10 pictures where at least one member of the group was not looking directly at the camera in the delete category 116.

The quality factor module 110 may analyze the set of pictures (e.g. the 30 pictures of the bride, the 30 pictures of the groom, and the 40 pictures of the wedding party) as individual sets based on their key feature in order to prevent one key feature from not being placed in the save category and in order to utilize different quality factors for each set. For example, if the bride and groom's set of pictures were all taken while the bride and groom were not paying attention to a camera, using the wedding party's quality factor of looking/not looking at the camera would place the bride and groom's set of pictures in the delete category 116.

In some embodiments, the image repository 104 may automatically delete the images placed in the delete category 116. In some embodiments, system 100 may alert the user that images were placed in the delete category 116 and wait for a response from the user to delete the images or move the images to a permanent storage space.

In some embodiments, the images in the save category 112 may be ranked by the ranking module 114. The ranking module 114 may rank the images based on which images are mostly likely to be associated with a predicted action of the user. The predicted action of the user may be determined from previous actions performed by the user in response to previous images. For example, the system 100 may identify from previous images, which images are likely to be deleted, saved, shared (e.g., via social media, through text message, etc.), wallpapered as the user's device background, etc.

The ranking module 114 make take into account the previous actions identified by the system 100 and rank the images recently sorted in to the save category 112 based on the previous actions. For example, the image repository 104 may receive 20 pictures of a user's child's graduation ceremony. The image repository 104 using the modules 106, 108, and 110, may sort the 20 pictures, placing 15 pictures in the save category 112 and 5 pictures in the delete category 116.

The ranking module 114, using information provided by the system 100, may identify that the child is currently the user's background on their smartphone (e.g., one of the devices 102A-C). The ranking module 114 may determine that a likely action of the user for the pictures is to change the background of their smartphone. Thus, the ranking module 114 may analyze the 15 images and rank the image of the user's child actually receiving their diploma and shaking hands with the school's principal is the best image to replace the user's background. The ranking module 114, may rank that picture as the best image because 10 of the other pictures are the user's child sitting during the ceremony, and 4 of the pictures are the user walking in line waiting to get their diploma, the ranking module 114 (in some embodiments, provided with information form the key feature detector module 108) may determine that the actual act of receiving a document (e.g., the diploma) versus the child sitting or walking, is the best image to provide to the user (e.g., change the user's background wallpaper).

In some embodiments, upon ranking the images in the save category 112 by using the ranking module 114, the image repository 104 may transfer the highest ranked image to the display 118. For example, the ranking module 114 may determine that a user is most likely post images to social media sites (e.g., the display 118) and the ranking module 114 may rank received images on how likely the images are to generate notoriety (e.g., "likes) for the user. The ranking module 114 may determine the image most likely to generated the greatest amount of notoriety and automatically post the image to the social media site for the user. In some embodiments, the system 100 may provide a notification to the user that the image was posted to the social media site. In other embodiments, the notification may ask the user for approval to posted the image before uploading the image to the social media sight. In some embodiments, the system 100 may not only display the highest ranked image, the system 100 may display every image in the save category 112 as an ordered image gallery, ordered from the highest ranked image to the lowest ranked image.

Figure 2:
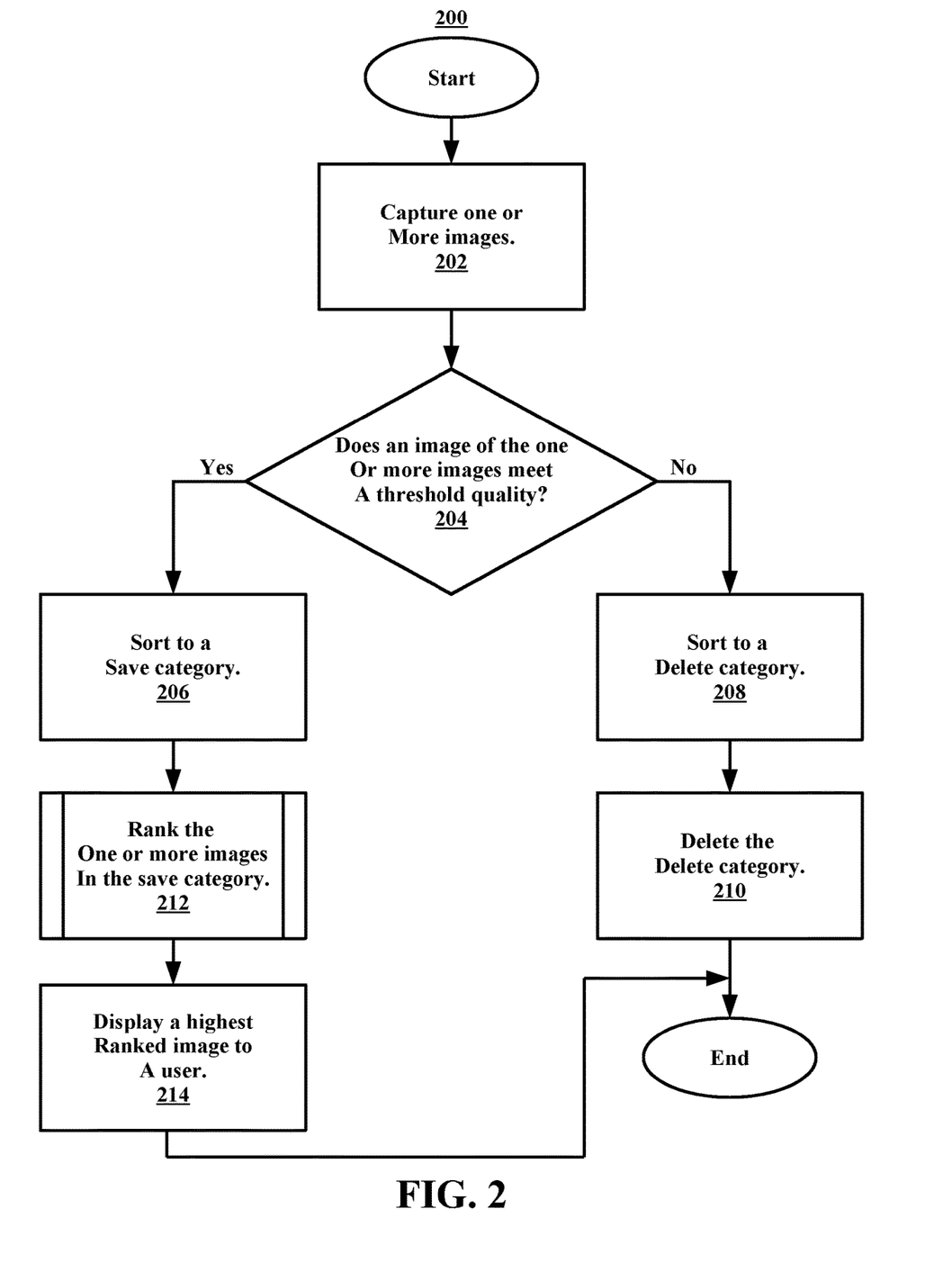
FIG. 2 illustrates a flowchart an example method for sorting images based on predicted user actions, in accordance with embodiments of the present disclosure.

Referring now to FIG. 2, illustrated is a flowchart an example method 200 for sorting images based on predicted user actions, in accordance with embodiments of the present disclosure. In some embodiments, the method 200 may be performed by a device or a processor in a device. The method 200 may being at operation 202, where a device may capture one or more images.

The method 200 may proceed to decision block 204. At decision block 204 the device will determine if an image meets a threshold quality (e.g., is not blurry, is focused, is not too light or dark, etc.). If at decision block 204 the image is determined to not meet the threshold quality, the method 200 may proceed to operation 208, where the image is sorted to a delete category. After operation 208, the method 200 may proceed to operation 210. At operation 210 the delete category may be deleted. The method 200 may end after operation 210.

In some embodiments, if at decision block 204 the image is determined to meet the threshold quality, the method 200 may proceed to operation 206. At operation 206, the image may be sorted to a save category. After operation 206, the method 200 may proceed to operation 212, where all images in the save category may be ranked. Operation 212 will be discussed further below in regard to the method 300 of FIG. 3.

After operation 212, the method 200 may proceed to operation 214. At operation 214, the device may display the highest ranked image among the images ranked in the save category to a user. The method 200 may end after operation 214.

Figure 3:
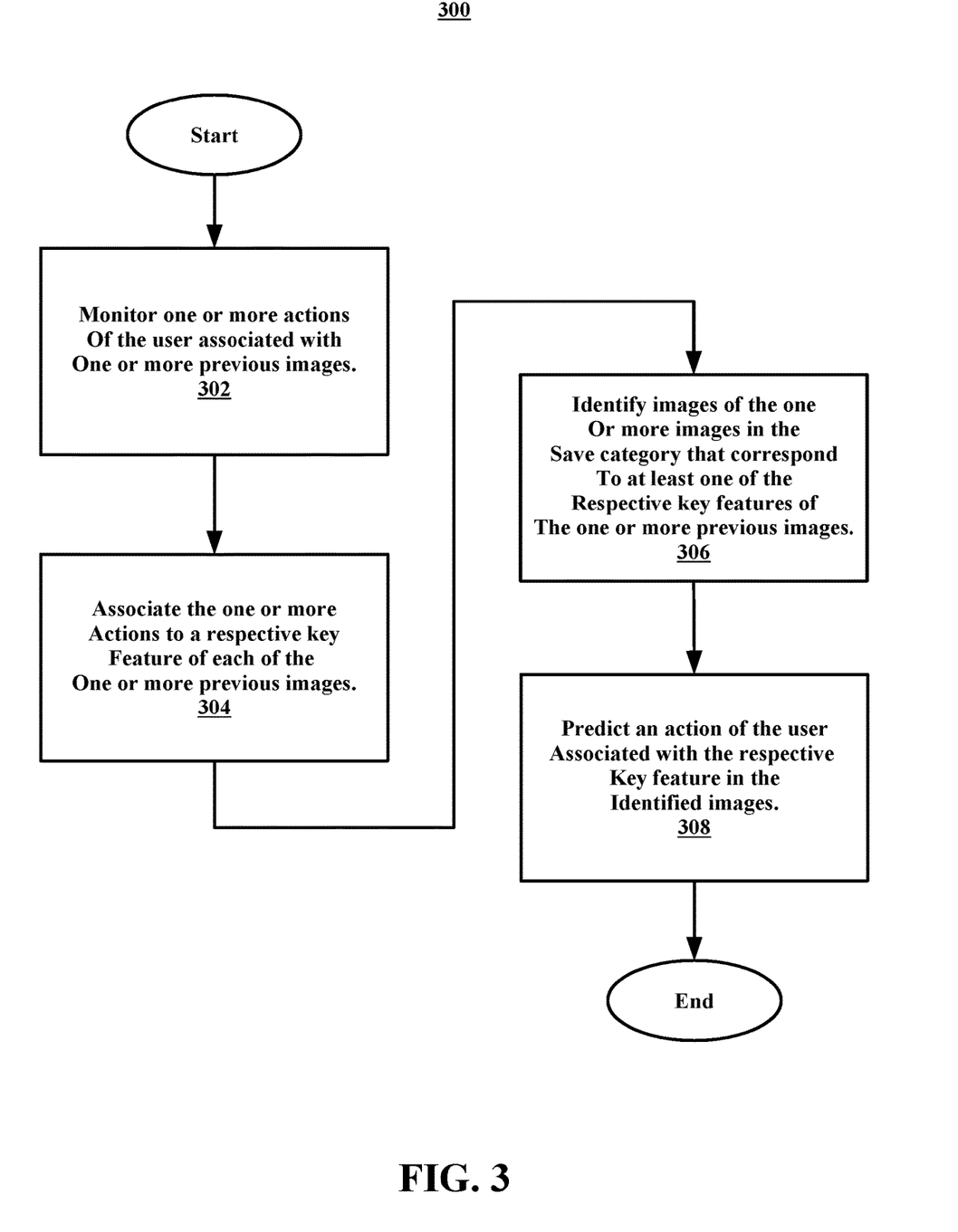
FIG. 3 illustrates a flowchart of an example method for ranking images based on predicted user actions, in accordance with embodiments of the present disclosure.

Referring now to FIG. 3, illustrated is a flowchart of an example method 300 for ranking images based on predicted user actions, in accordance with embodiments of the present disclosure. In some embodiments, the method 300 may correspond to operation 212 of FIG. 2.

The method 300 may begin at operation 302, where the device (previously mentioned in regard to the method 200 of FIG. 2) may monitor one or more actions of the user associated with one or more previous images (e.g., posting an image to social media, texting the image, saving the image to a specific folder, deleting the image, etc.). That is, the device my monitor how the user interacts with and/or reacts to one or more previous images displayed to the user. After operation 302, the method 300 may proceed to operation 304. At operation 304, the device may associate the one or more actions to a respective key feature of each of the one or more images. The association may be made using indicators/tags generated by the device.

For example, the device, using a front-facing camera in the device, may monitor how long a user makes eye contact with the device while on a certain image that was previously captured by the user. The device may determine that images containing the user's family induce the user to make eye contact with the device for a duration longer than images containing the user's coworkers. In some embodiments, the device may monitor user actions performed by the user on previous images to continually increase the accuracy of ranking new images received by the device. This may allow the device to more efficiently display an image most likely to derive a predicted (re)action from the user.

After operation 304, the method 300 may proceed to operation 306. At operation 306, the device may identify images of the one or more images in the save category that correspond to (e.g., include) at least one of the respective key features of the one or more previous images. Following the example above, the user may capture 10 new images with the device. The device may identify that the images as pictures of the user's birthday party and that 5 of the images include the user's relatives and 5 of the images include the user's coworkers. The device may identify the user's family and coworkers by using facial recognition techniques and being connected to a social media account that details the relation each individual has to the user.

After operation 306, the method 300 may proceed to operation 308. At operation 308, the device may predict an action of the user associated with the respective key feature in the identified images. After operation 308, the method 300 may end.

Again, following the example above, the device may associate the newly captured images of the user's family with a longer view duration than the new images of the coworkers. The device may rank the images of the family above the images of the coworkers and display the images of the family to the user first. In some embodiments, the rank may be for a group of images, such as all the family images being ranked above all of the coworker images.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
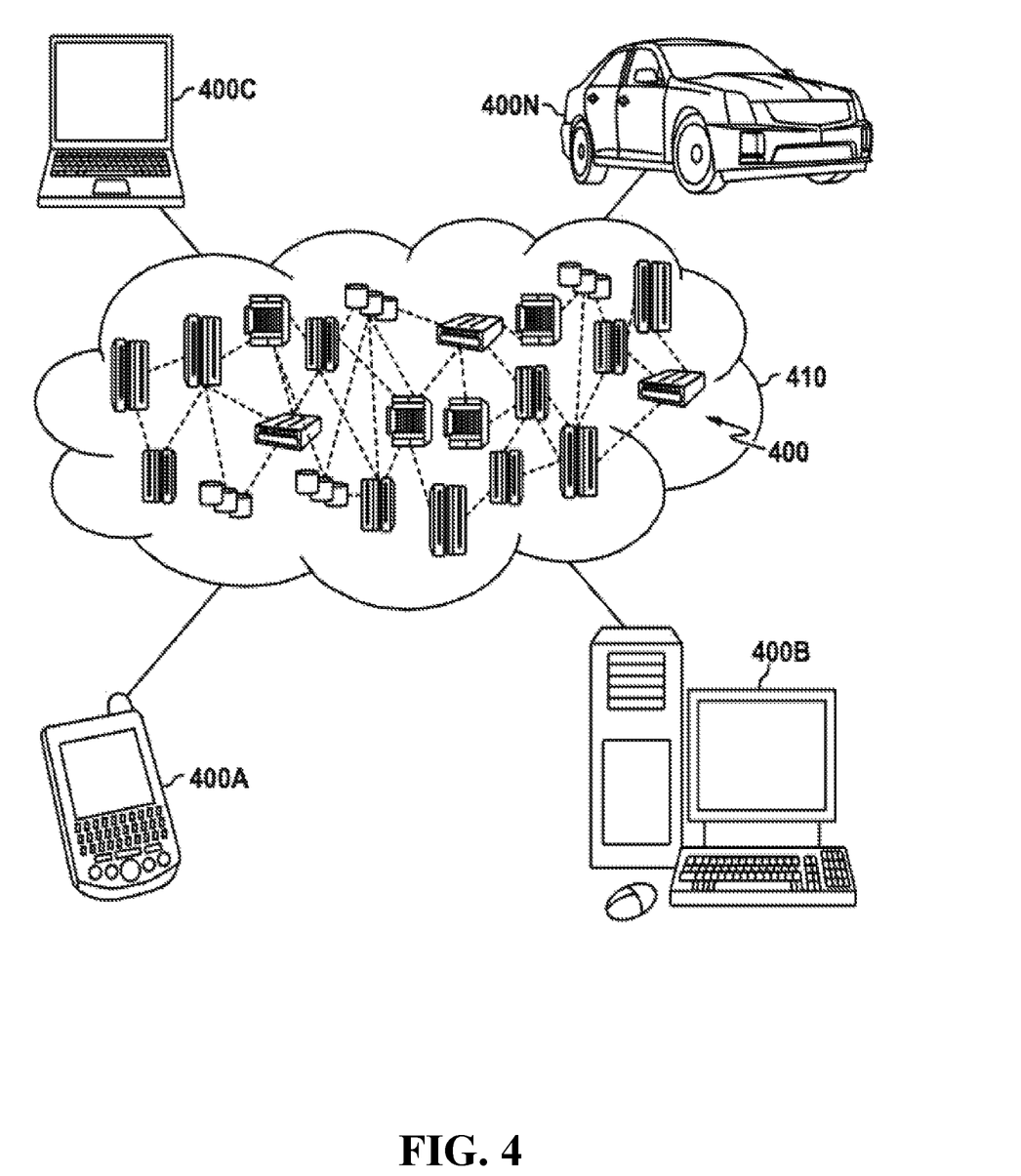
FIG. 4 depicts a cloud computing environment, in accordance with embodiments of the present disclosure.

Referring now to FIG. 4, illustrative cloud computing environment 410 is depicted, in accordance with embodiments of the present disclosure. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
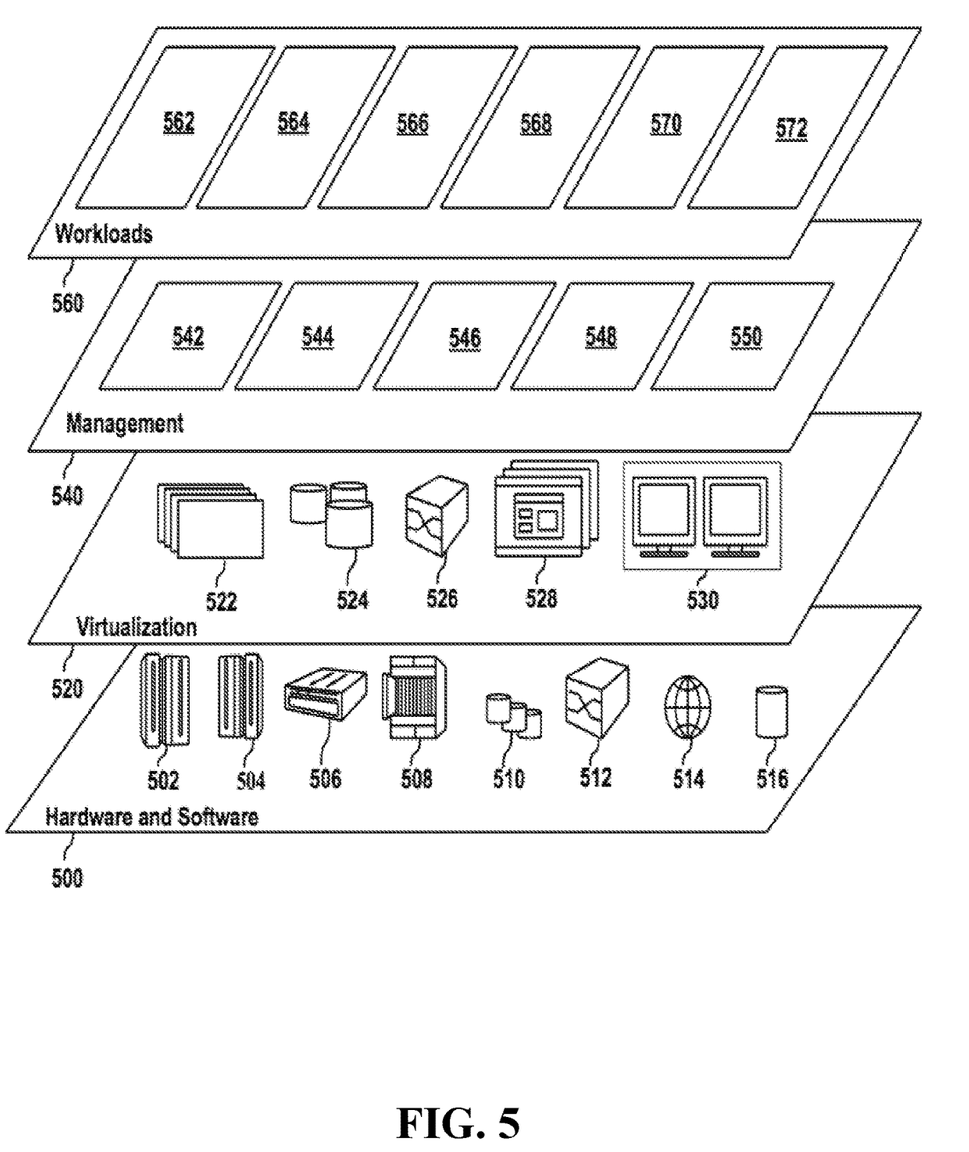
FIG. 5 depicts abstraction model layers, in accordance with embodiments of the present disclosure.

Referring now to FIG. 5, a set of functional abstraction layers provided by cloud computing environment 410 (FIG. 4) is shown, in accordance with embodiments of the present disclosure. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and automatically sorting multiple images 572.

Figure 6:
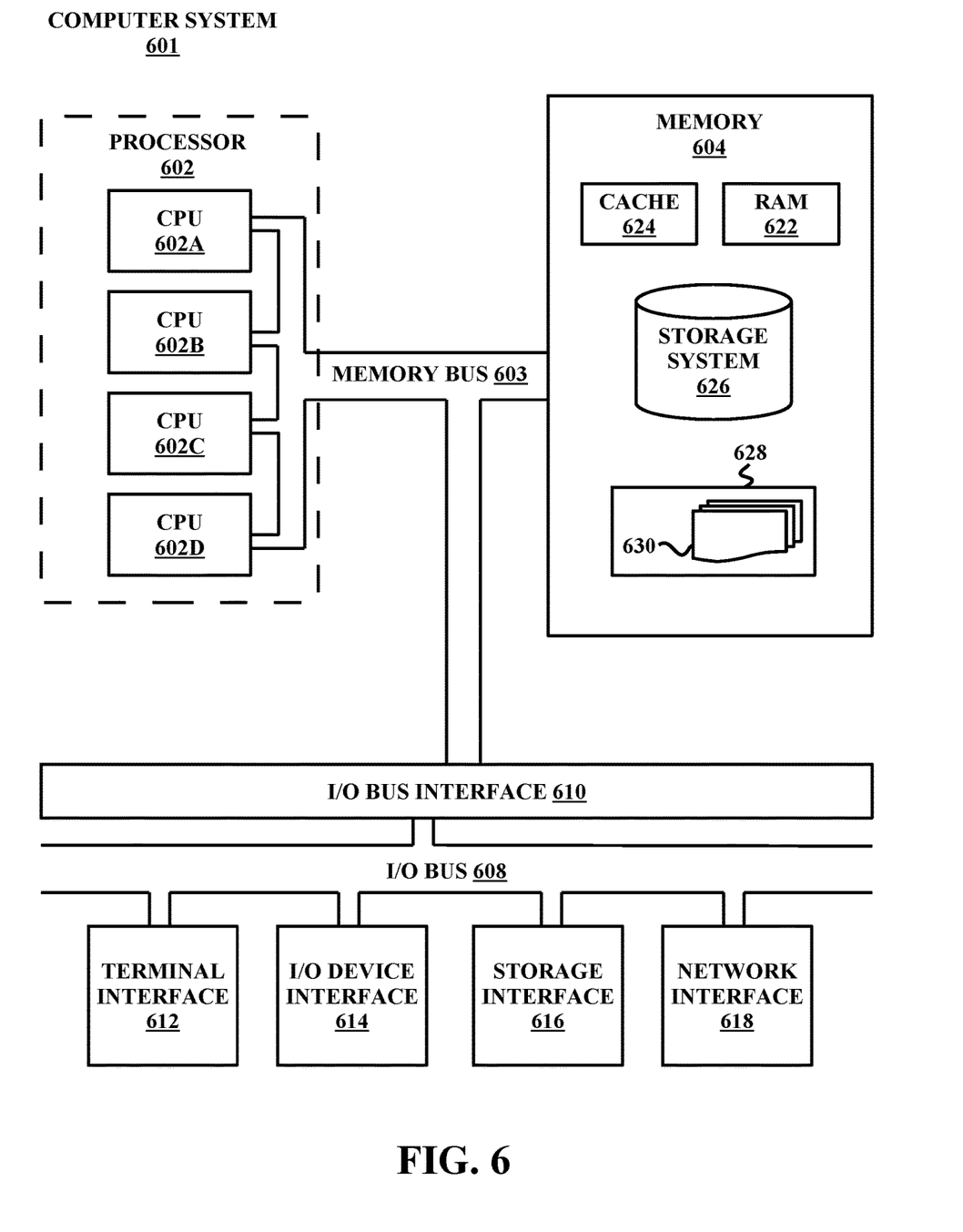
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   capturing, by a device, one or more images;
   sorting, automatically, the one or more images into a save category and a delete category;
   predicting an action of a user towards the one or more images in the save category, wherein the predicted action is determined by identifying an average viewing time for each of one or more previous images the user views and associating the average viewing time for each of the one or more previous images to a respective key feature of each of the one or more previous images, and wherein the average viewing time for each of the one or more previous images is further associated with the one or more previous images being sent to a specific location;
   ranking, based on the predicted action of the user, the one or more images in the save category, wherein ranking the one or more images in the save category includes identifying a first image of the one or more images in the save category that includes a key feature of the one or more previous images that has a longest average viewing time among the respective average viewing times of the one or more previous images; and
   displaying the first image to the user, wherein the first image has a highest rank among the one or more images in the save category;
   identifying that the user did not act as predicted to the display of the first image;
   re-ranking, based on the user's predicted action and actual action to the display of the first image, the one or more images in the save category; and
   displaying a second picture to the user.

2. The method of claim 1, wherein capturing the one or more images comprises:
   modifying, automatically, a setting of the device during the capturing of the one or more images, wherein the setting is determined by the predicted action of the user.

3. The method of claim 1, wherein sorting the one or more images into the save category and the delete category includes:
   analyzing each of the one or more images; and
   determining a respective key feature in each of the one or more images.

4. The method of claim 3, further comprising:
   identifying, from the respective key feature in each of the one or more images, a threshold quality of the respective key feature;
   separating each image with the respective key feature below the threshold quality into the delete category; and
   separating each image with the respective key feature above the threshold quality into the save category.

5. The method of claim 1, further comprising:
   deleting the delete category, wherein deleting the delete category includes displaying an alert to the user, the alert providing a response option for the user to delete the delete category; and
   identifying the response of the user.

6. A system comprising:
   a memory; and
   a processor in communication with the memory, the processor being configured to perform operations comprising:
   capturing, by a device, one or more images;
   sorting, automatically, the one or more images into a save category and a delete category;
   predicting an action of a user towards the one or more images in the save category, wherein the predicted action is determined by identifying an average viewing time for each of one or more previous images the user views and associating the average viewing time for each of the one or more previous images to a respective key feature of each of the one or more previous images, and wherein the average viewing time for each of the one or more previous images is further associated with the one or more previous images being sent to a specific location;
   ranking, based on the predicted action of the user, the one or more images in the save category, wherein ranking the one or more images in the save category includes identifying a first image of the one or more images in the save category that includes a key feature of the one or more previous images that has a longest average viewing time among the respective average viewing times of the one or more previous images; and
   displaying the first image to the user, wherein the first image has a highest rank among the one or more images in the save category;
   identifying that the user did not act as predicted to the display of the first image;
   re-ranking, based on the user's predicted action and actual action to the display of the first image, the one or more images in the save category; and
   displaying a second picture to the user.

7. The system of claim 6, wherein capturing the one or more images comprises:
modifying, automatically, a setting of the device during the capturing of the one or more images, wherein the setting is determined by the predicted action of the user.

8. The system of claim 6, wherein sorting the one or more images into the save category and the delete category includes:
analyzing each of the one or more images; and
determining a respective key feature in each of the one or more images.

9. The system of claim 8, further comprising:
identifying, from the respective key feature in each of the one or more images, a threshold quality of the respective key feature;
separating each image with the respective key feature below the threshold quality into the delete category; and
separating each image with the respective key feature above the threshold quality into the save category.

10. The method of claim 1, further comprising:
deleting the delete category, wherein deleting the delete category includes displaying an alert to the user, the alert providing a response option for the user to delete the delete category; and
identifying the response of the user.

11. A computer program product comprising a non-transitory computer readable storage medium having program instructions embodied therewith, the program instructions executable by a processor to cause the processor to perform a method, the method comprising:
capturing, by a device, one or more images;
sorting, automatically, the one or more images into a save category and a delete category;
predicting an action of a user towards the one or more images in the save category, wherein the predicted action is determined by identifying an average viewing time for each of one or more previous images the user views and associating the average viewing time for each of the one or more previous images to a respective key feature of each of the one or more previous images, and wherein the average viewing time for each of the one or more previous images is further associated with the one or more previous images being sent to a specific location;
ranking, based on the predicted action of the user, the one or more images in the save category, wherein ranking the one or more images in the save category includes identifying a first image of the one or more images in the save category that includes a key feature of the one or more previous images that has a longest average viewing time among the respective average viewing times of the one or more previous images; and
displaying the first image to the user, wherein the first image has a highest rank among the one or more images in the save category;
identifying that the user did not act as predicted to the display of the first image;
re-ranking, based on the user's predicted action and actual action to the display of the first image, the one or more images in the save category; and
displaying a second picture to the user.

12. The computer program product of claim 11, wherein capturing the one or more images comprises:
modifying, automatically, a setting of the device during the capturing of the one or more images, wherein the setting is determined by the predicted action of the user.

13. The computer program product of claim 11, wherein sorting the one or more images into the save category and the delete category includes:
analyzing each of the one or more images; and
determining a respective key feature in each of the one or more images.

14. The computer program product of claim 13, further comprising:
identifying, from the respective key feature in each of the one or more images, a threshold quality of the respective key feature;
separating each image with the respective key feature below the threshold quality into the delete category; and
separating each image with the respective key feature above the threshold quality into the save category.

15. The method of claim 1, further comprising:
deleting the delete category, wherein deleting the delete category includes displaying an alert to the user, the alert providing a response option for the user to delete the delete category; and
identifying the response of the user.

* * * * *